(No Model.)
D. T. TAYLOR.
MACHINE FOR DISTRIBUTING FERTILIZERS.
No. 435,465. Patented Sept. 2, 1890.
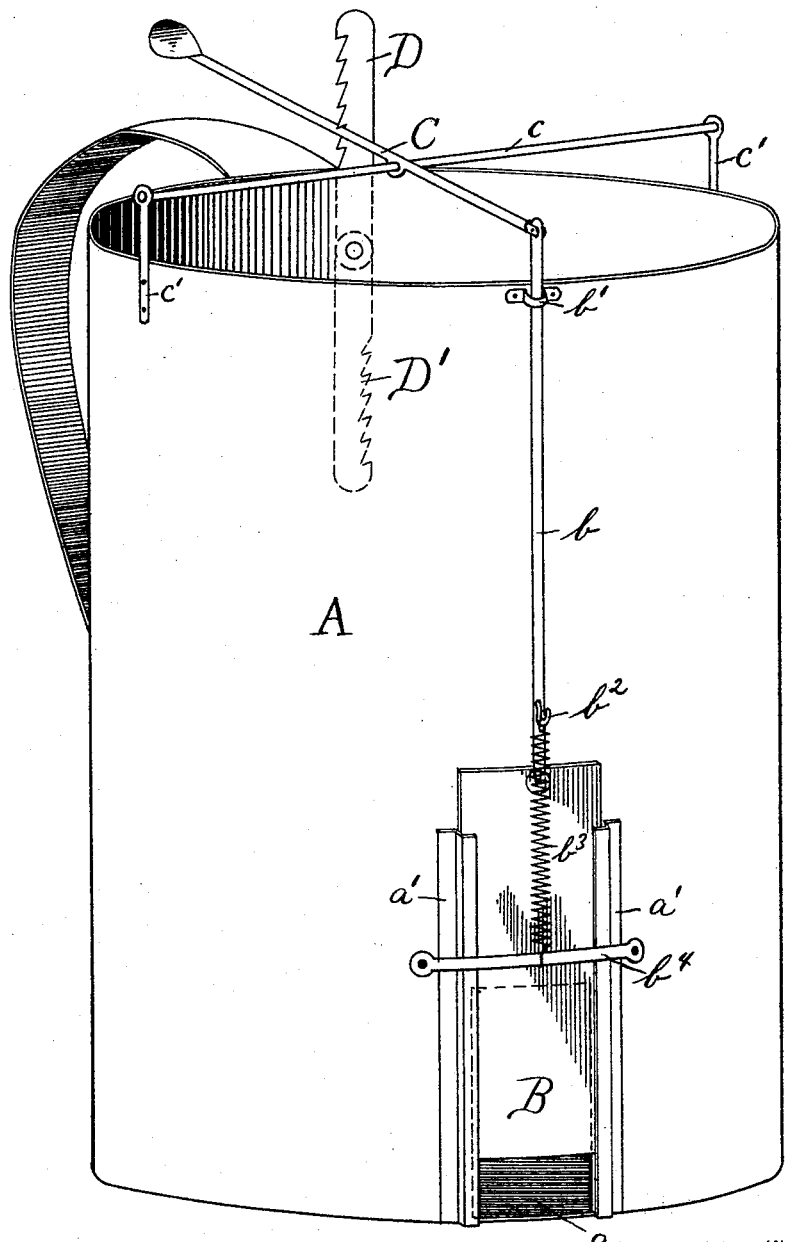
WITNESSES:
Alfred E. Glascock.
M. E. Lansdale.
INVENTOR
D. T. Taylor
BY John S. Duffie
ATTORNEY

UNITED STATES PATENT OFFICE.

DIOTICIAN THOMPSON TAYLOR, OF GREENSBURG, LOUISIANA.

MACHINE FOR DISTRIBUTING FERTILIZERS.

SPECIFICATION forming part of Letters Patent No. 435,465, dated September 2, 1890.

Application filed June 13, 1890. Serial No. 355,276. (No model.)

*To all whom it may concern:*

Be it known that I, DIOTICIAN THOMPSON TAYLOR, a citizen of the United States, residing at Greensburg, in the parish of St. Helena and State of Louisiana, have invented certain new and useful Improvements in Machines for Distributing Fertilizers; and I do declare the following to be a full, clear, and exact description of the invention, such as will enable others skilled in the art to which it appertains to make and use the same, reference being had to the accompanying drawing, and to the letters of reference marked thereon, which form a part of this specification.

My invention has relation to fertilizer-distributers; and it consists in the novel construction and arrangement of its parts.

In the accompanying drawing the figure is a perspective view of my invention.

My invention is described as follows: I take a cup A and cut an opening $a$ in the front and extend it to the bottom of the cup. On each side of the opening $a$ is secured a vertical guide $a'$, between which works up and down the slide B. Slide B has attached to its upper end a vertical rod $b$, which passes through the guide $b'$. Said rod $b$ is provided with a hook $b^2$, from which extends downward a spiral spring $b^3$, the lower end of which is attached to the cross-rod $b^4$. Said rod $b^4$ serves the double purpose of a brace for the guides $a'$ $a'$ and an anchor for the spring $b^3$, as above described.

To the upper end of the rod $b$ is pivoted the end of a lever C, the other end of which is provided with a thumb-pad. Said lever C is fulcrumed to a horizontal bar $c$, and said bar $c$ is in turn securely fixed in uprights $c'$ $c'$, secured to the top of said cup. A little below the upper edge of the cup and a little to one side of the handle is pivoted a notch-bar D. Said bar D, when not in use, is allowed to swing down out of the way along the side of the cup, as shown by the dotted lines D'.

To operate my invention, I fill or partly fill the cup with fertilizer, and if I wish to drop the same in hills I let the notch-bar swing down by the side of the cup. When I come to a hill, I press on the thumb-pad of the lever C with the thumb of the hand in which the distributer is held. This will throw up the other end of said lever, which in turn will pull up the vertical rod $b$ and the slide B, attached to the lower end of said rod. By this movement it will be seen that the spiral spring $b^3$ will be stretched, and when enough fertilizer has run out through the opening $a$ I relinquish the pressure on the thumb-pad. This will allow the said spiral spring to contract, which will pull down the rod $b$ and the pivoted end of lever C. When rod $b$ descends, it will push the slide B down and close the opening $a$, thus stopping the flow of the fertilizer. This operation is repeated at every hill.

Should I wish to drop the fertilizer in rows, I bring the catch-bar to an upright position, and if I want to drop the fertilizer thick I catch the lever C under the lowest notch in the bar D, and if not so thick then under the one above it, and so on. Then I pass down a row, holding the distributer in one hand, and allow the fertilizer to run out, thus in both cases accomplishing with one hand what generally requires two.

Having described my invention, what I claim as new, and desire to secure by Letters Patent, is—

A fertilizer-distributer consisting of a cup A, having the opening $a$ and vertical guides $a'$, slide B, provided with a rod $b$, the upper end of which passes through the guide $b'$, said rod having a hook $b^2$, spiral spring $b^3$, its upper end fastened to a hook $b^2$ and its lower end to the cross-rod $b^4$, cross-rod $b^4$, secured to the side of the fertilizer and passing over the guides $a'$ $a'$, lever C, fulcrumed to the horizontal rod $c$, with one end pivoted to the upper end of rod $b$ and the other end provided with a thumb-pad, rod $c$, secured in uprights $c'$ $c'$, uprights $c'$ $c'$, secured to the sides of the said cup, and catch-bar D, pivoted to the outside of said cup and adapted to hold down the free end of the lever C, substantially as shown and described, and for the purposes set forth.

In testimony whereof I affix my signature in presence of two witnesses.

DIOTICIAN THOMPSON TAYLOR.

Witnesses:
J. B. GILL,
W. R. PARKER.